(12) United States Patent
Creedon et al.

(10) Patent No.: US 10,956,918 B1
(45) Date of Patent: Mar. 23, 2021

(54) ANALYTICALLY GENERATED MICRO-SERVICE CONSUMER-DRIVEN CONTRACTS AND AUTOMATED TESTS

(71) Applicant: EMC IP Holding Company LLC, Hopkinton, MA (US)

(72) Inventors: Sean Creedon, Ballincollig (IE); Ian Gerard Roche, Glanmire (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 15/800,593

(22) Filed: Nov. 1, 2017

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06F 16/28* | (2019.01) | |
| *G06N 5/04* | (2006.01) | |
| *G06N 5/02* | (2006.01) | |
| *G06N 20/00* | (2019.01) | |

(52) U.S. Cl.
CPC ....... *G06Q 30/0201* (2013.01); *G06F 16/285* (2019.01); *G06Q 10/067* (2013.01); *G06Q 10/10* (2013.01); *G06N 5/022* (2013.01); *G06N 5/047* (2013.01); *G06N 20/00* (2019.01)

(58) Field of Classification Search
CPC .................................................. G06Q 30/02
See application file for complete search history.

(56) References Cited

U.S. PATENT DOCUMENTS

| | | | | |
|---|---|---|---|---|
| 7,340,408 B1* | 3/2008 | Drew | ..................... | G06Q 30/02 |
| | | | | 705/7.33 |
| 2010/0179898 A1* | 7/2010 | Wade | ..................... | G06Q 10/10 |
| | | | | 705/35 |
| 2013/0268914 A1* | 10/2013 | Oslake | .................. | G06F 9/5072 |
| | | | | 717/120 |
| 2013/0275571 A1* | 10/2013 | Barton | ............... | H04N 21/2541 |
| | | | | 709/223 |
| 2014/0188565 A1* | 7/2014 | Dantressangle | ....... | G06Q 50/06 |
| | | | | 705/7.33 |

(Continued)

OTHER PUBLICATIONS

"Consumer Driven Contract Testing Using Pact", downloaded from https://cloud.spring.io/spring-cloud-contract/.
"Spring Cloud Contract", downloaded from https://docs.pact.io/.

*Primary Examiner* — Kurtis Gills
(74) *Attorney, Agent, or Firm* — Ryan, Mason & Lewis, LLP

(57) ABSTRACT

Techniques are provided for analytically generating micro-service Consumer- Driven Contracts and automated tests. One method comprises obtaining a plurality of usage data records for consumers of a service from a run-time environment; extracting data features from the usage data records; applying a clustering algorithm to the usage data records to assign the usage data records to a given usage pattern cluster of a plurality of usage pattern clusters based on the extracted data features, wherein each of the plurality of usage pattern clusters comprises usage data records; and performing the following steps when the clustering algorithm creates a new usage pattern cluster: creating a new Consumer-Driven Contract that defines consumer expectations of the service, with respect to the new usage pattern associated with the new usage pattern cluster; and generating automated Consumer-Driven Contract tests to test the new Consumer-Driven Contract.

20 Claims, 7 Drawing Sheets

(56) References Cited

U.S. PATENT DOCUMENTS

2017/0249661 A1* 8/2017 Alzate Perez ......... G06N 20/00
2018/0146067 A1* 5/2018 Du ......................... H04L 67/32
2018/0295036 A1* 10/2018 Krishnamurthy ... H04L 41/0893

* cited by examiner

1. Obtain new usage data 117;
2. Extract data factors from usage data 117;
3. Send data factors to Analytical Model 220;
4. Receive and interpret a response from Analytical Model 220;
5. If the Response identifies a new cluster pattern, then trigger an event to create a new CDC 250, tests 252 and associated test data 254;
6. The CDC 250, tests 252 and associated test data 254 are integrated into the software development life cycle (SDLC) process 102; and
7. If the response is an existing cluster pattern, then update detection information, such as date as this can be used as additional information to decide if a CDC has not been seen or used in a long time, thus removing and possibly de-scoping service functionality.

FIG. 4

```
TimeStamp|Service Name|Consumer ID|Request Type|Headers|URL|Request Body|Reponse Status|Response Body
1000000|ServiceA|Consumer1|GET|Content-Type:application/json|/products/latest?limit=3||200|"products": [{"id": 1,"name": "Product1"}{{"id": 2,"name": "Product2"}{"id": 3,"name": "Product3"}]
1000001|ServiceA|Consumer1|GET|Content-Type:application/json|/products/latest?limit=3||200|"products": [{"id": 1,"name": "Product1"}{{"id": 2,"name": "Product2"}{{"id": 3,"name": "Product3"}]
1000002|ServiceA|Consumer1|GET|Content-Type:application/json|/products/latest?limit=3||200|"products": [{"id": 1,"name": "Product1"}{{"id": 2,"name": "Product2"}{{"id": 3,"name": "Product3"}]
```

```
{
  "consumer": {
    "name": "Analytics Consumer"
  },
  "provider": {
    "name": "ServiceA"
  },
  "interactions": [
    {
      "description": "cluster 3",
      "provider_state": "production",
      "request": {
        "method": "GET",
        "path": "/products/latest?limit=1 ",
        "headers": {
          "Accept": "application/json"
        }
      },
      "response": {
        "status": 200,
        "headers": {
          "Content-Type": "application/json"
        },
        "body": {
          "products": [
            {
              "id": 1,
              "name": "Product1"
            }
          ]
        }
      }
    }
  ],
  "metadata": {
  "pactSpecificationVersion": "2.0.0"
  }
}
```

US 10,956,918 B1

ANALYTICALLY GENERATED MICRO-SERVICE CONSUMER-DRIVEN CONTRACTS AND AUTOMATED TESTS

FIELD

The field relates generally to a micro-service environment.

BACKGROUND

Micro-services provide a loose coupling among technical components, which, in turn, provides individual development teams with more flexibility to produce and consume such technical components based on their needs.

A Consumer-Driven Contract (CDC) is an approach where consumers of a service can express their expectations of the service to the producer of the service in a mutually agreed upon format. CDC Testing is the process of writing automated tests to ensure the specified contract expectations are met, for example, when changes are made to the service.

One problem with successfully evolving micro-services using Consumer-Driven Contract testing is keeping pace with the rate at which new consumers can be introduced with API (application programming interface) Gateways, and how these consumers interpret and use the micro-service.

A need exists for improved techniques for generating micro-service Consumer-Driven Contracts and automated testing of the Consumer-Driven Contracts.

SUMMARY

In one embodiment, a method is provided for analytically generating micro-service Consumer-Driven Contracts and automated tests. An exemplary method comprises obtaining a plurality of usage data records for a plurality of consumers of a service from a run-time environment; extracting one or more data features from each of the usage data records; applying a clustering algorithm to the usage data records to assign the usage data records to a given usage pattern cluster of a plurality of usage pattern clusters based on the one or more extracted data features, wherein each of the plurality of usage pattern clusters comprises usage data records; and performing the following steps when the clustering algorithm creates a new usage pattern cluster: creating a new Consumer-Driven Contract that defines consumer expectations of the service, with respect to the new usage pattern associated with the new usage pattern cluster; and generating one or more automated Consumer-Driven Contract tests to test the new Consumer-Driven Contract.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for an exemplary implementation of the application of FIG. 2, according to one embodiment of the disclosure;

FIG. 4 illustrates exemplary sample data that may be processed by the analytics engine of FIG. 2, according to an embodiment of the disclosure;

FIG. 6 illustrates exemplary pseudo code for processing a number of factors extracted from the exemplary sample data of FIG. 4, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for analytically generating micro-service Consumer-Driven Contracts and automated testing of the Consumer-Driven Contracts.

In one or more embodiments, improved techniques are provided for generating Consumer-Driven Contracts (CDCs) and automated tests for such CDCs using clustering techniques to automatically detect new usage patterns. Clustering techniques are applied to usage data records related to a given service to assign the usage data records to one cluster of a plurality of usage pattern clusters. The creation of a new cluster indicates a new usage pattern which requires the generation of new CDCs and automated tests for the new CDCs.

One or more aspects of the disclosure recognize that many development teams fail to obtain access to usage data and employ manual methods with the cooperation of consumers to define CDCs. While this technique may be effective for defining a CDC during an initial service roll-out, it becomes more difficult for teams to focus on services that are currently stable and running in production, as their attention is directed to newer services. Thus, the development team begins to lose confidence in the effectiveness of the CDC ecosystem.

It is unlikely that all consumers of a service will diligently employ the manual efforts to keep the CDC up-to-date and more importantly, to keep the automated tests of the CDC up-to-date.

In addition, associated test data for CDC automated testing can also be difficult to obtain, as significant effort is often required to generate generic (anonymous) data.

Typical catalysts that focus attention on the CDC ecosystem are new service features (deployed infrequently) or "technical refreshes" that require new deployments and result in development teams (which may be different than the original authors) losing confidence in the automated CDC testing.

Figure 1:
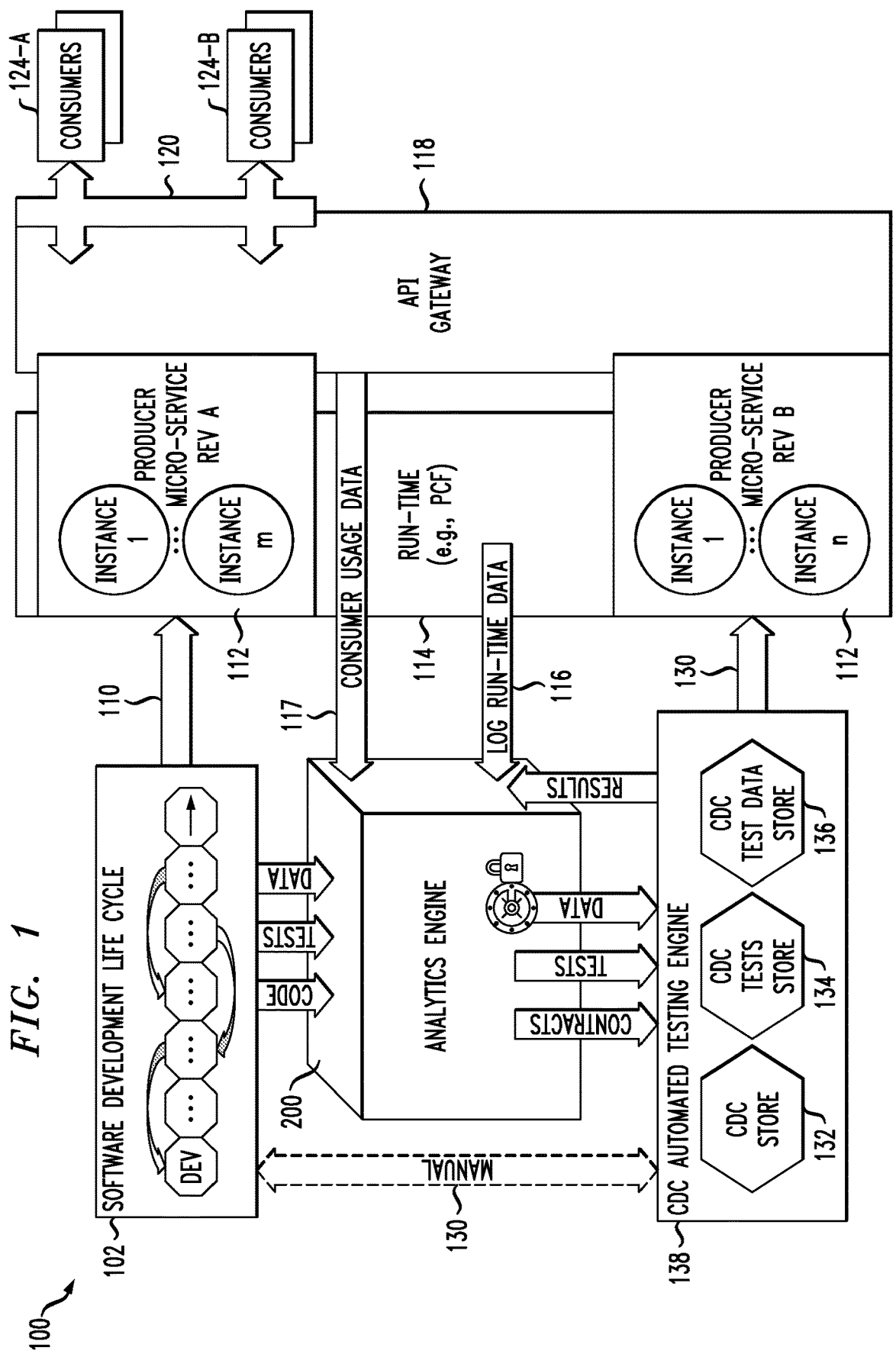
FIG. 1 illustrates an automated CDC test generation system, according to one embodiment of the disclosure.

FIG. 1 illustrates an automated CDC test generation system 100, according to one embodiment of the disclosure. Generally, the automated CDC test generation system 100 provides an analytical solution for generating and maintaining CDCs, automated tests for CDCs and associated test data in an up-to-date manner.

As shown in FIG. 1, the automated CDC test generation system 100 comprises a Continuous Integration/Continuous Delivery (CI/CD) Micro-Service Deployment 110 following an initial software development in a software development life cycle 102 of one or more instances of a developed micro-service 112 (Rev A). The micro-service product is deployed into a Platform as a Service (PaaS) run-time environment 114, such as a Pivotal Cloud Foundry (PCF) run-time environment.

As part of the deployment 110, the Service Business Contract and Provider Contract are typically defined. For example, code and unit/integration tests are developed for a service to fulfill the provider contract, and the service is deployed, in a known manner.

Thereafter, a managed distribution 120 of the service occurs to two exemplary different consumer groups 124-A and 124-B using an API Gateway 118 (e.g., Boomi API Management Gateway). In this manner, consumers 124 can optionally be segregated in relation to, for example, Service Level Agreements (SLAs); usage throttling and security access management, in a known manner.

In one or more implementations, a manual management 130 of the CDC automated test environment allows consumers 124 to directly contribute to both the CDC and the tests. For ease of illustration, this process has been shown in FIG. 1 as part of the software development life cycle 102. With the manual management 130 shown in FIG. 1, consumers 124 express their needs and usage of a service in a manual fashion (for example, sending information via a Microsoft Excel™ spreadsheet to the service development team), with unit tests and data optionally included. The development team processes the information from the consumers 124 and generates tests of the CDC. The generated tests are deployed and executed as part of the CI/CD Micro-Service Deployment 110.

As shown in FIG. 1, as part of the software development life cycle 102 of a micro-service 112 a new version may be deployed to the run-time environment 114, such as micro-service 112 Rev B.

In one or more embodiments of the present disclosure, analytical clustering and anomaly detection techniques are used by an analytics engine 200, as discussed further below in conjunction with FIG. 2, to automatically create CDC expectations from real-time data micro-service call information retrieved via the API Gateway 118 and run-time operations data 116. As shown in FIG. 1 and discussed further below, the exemplary analytics engine 200 receives code data, CDC tests and test data from the software development life cycle 102; consumer usage data 117 from the API gateway 118 and log run-time data 116 from the run-time environment 114. The CDC tests are implemented, for example, by a CDC automated testing engine 138.

In addition, the exemplary analytics engine 200 generates (i) contracts that are stored in a corresponding CDC store 132 of the CDC automated testing engine 138; (ii) tests that are stored in a corresponding CDC test store 134 of the CDC automated testing engine 138; and (iii) test data that is stored in a corresponding CDC test data store 136 of the CDC automated testing engine 138. Results of the CDC testing are also provided by the CDC automated testing engine 138 to the analytics engine 200 in a results feedback path.

In the exemplary embodiment of FIG. 1, the test data that is stored in a corresponding CDC test data store 136 using a secure version control system that stores the test data, where access is controlled with, for example, a username and password, such that access is only allowed to certain users and the system account that runs the tests (for example, GIT or Subversion).

As usage patterns of the service 112 evolve, for example, with the addition of new consumers 124, new usage patterns are automatically identified and classified by the analytics engine 200, as discussed further below, based on, for example, consumer group, type and volume.

In addition, in one or more embodiments, once an expectation or new usage pattern is detected, the automated CDC test generation system 100 generates generic (anonymous) data and tests to validate the usage that is important to different consumers 124.

Figure 2:
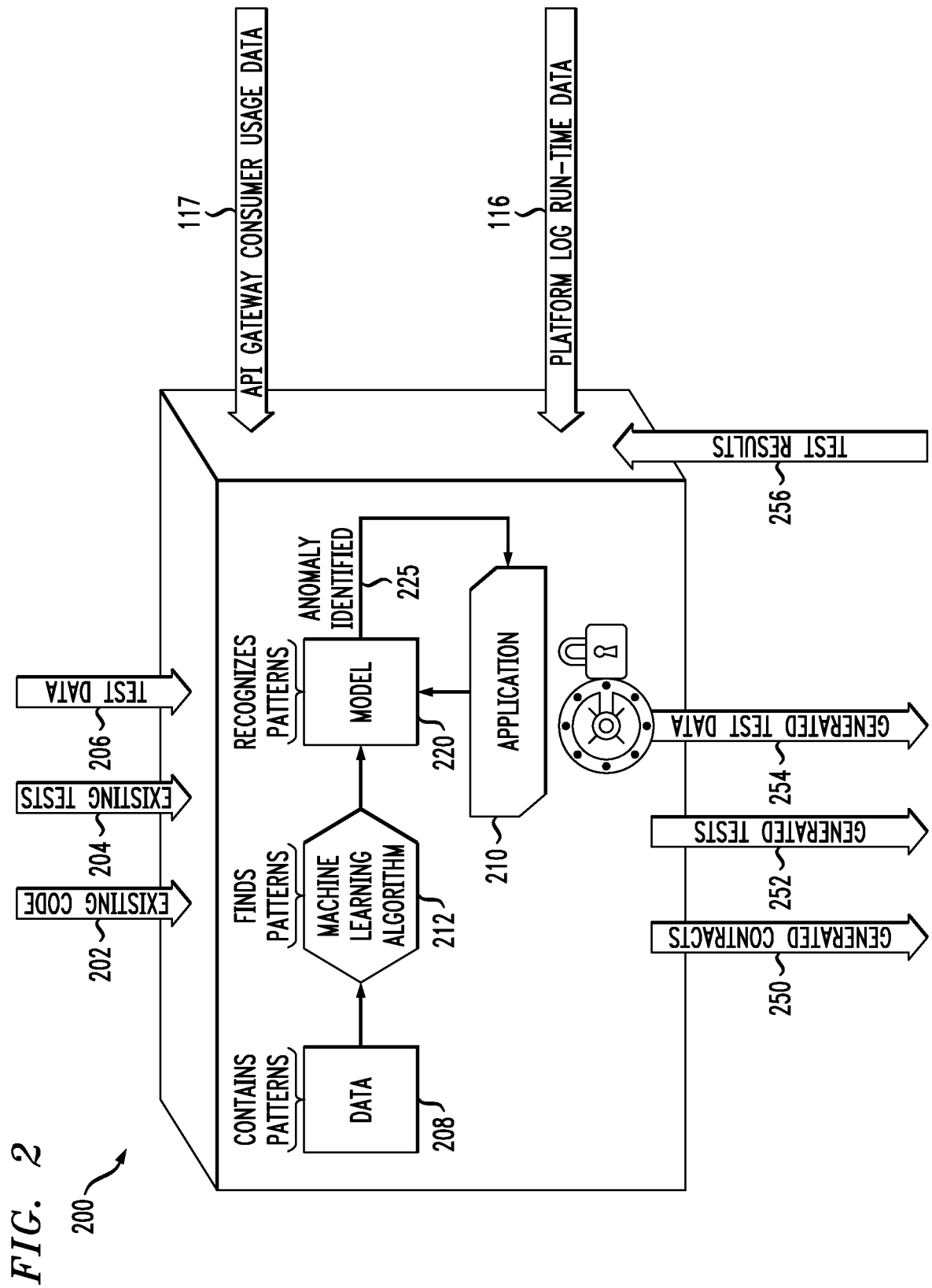
FIG. 2 illustrates the analytics engine of FIG. 1, in further detail, according to an embodiment of the disclosure.

FIG. 2 illustrates the exemplary analytics engine 200 of FIG. 1, in further detail, according to an embodiment of the disclosure. Generally, the exemplary analytics engine 200 provides an analytical solution to detect new usage patterns using clustering and anomaly detection techniques, and to automatically generate CDCs with respect to the new usage patterns, and automated tests for the new CDCs.

As shown in FIG. 2, the exemplary analytics engine 200 receives, as inputs, existing code 202, existing tests 204 and existing test data 206, for a given micro-service, such as micro-service 112 of FIG. 1. Collectively, the existing code 202, existing tests 204 and existing test data 206 (or portions thereof) comprise data 208 that is applied to a machine learning algorithm 212. The exemplary analytics engine 200 also receives the consumer usage data 117 from the API gateway 118 and log run-time data 116 (e.g., application logs and environment run-time (PCF) data) from the run-time environment 114, as discussed above in conjunction with FIG. 1.

The data 208 comprises usage patterns that are detected by the machine learning algorithm 212 using extracted features (e.g., an individual measurable property or characteristic of a phenomenon being observed), in a manner described further below. The machine learning algorithm 212 employs feature-based pattern detection to create an analytical model 220.

The exemplary analytics engine 200 comprises an application 210 that provides new data to the analytical model 220 and reacts to anomalies 225 that are identified according to the model 220. Generally, anomalies 225 correspond to non-standard (new) usage patterns that potentially require new CDCs and CDC testing. The CDC testing should be performed to test the new manner in which the consumer 124 is using the micro-service 112.

In response to one or more detected anomalies 225, the application 210 generates one or more CDCs 250, corresponding automated tests 252 of the CDCs 250 and associated anonymous test data 254 obtained from running the tests 252, that are stored in corresponding data stores 132, 134, 136 of the CDC automated testing engine 138, as discussed above in conjunction with FIG. 1. The results of the CDC testing are provided by the CDC automated testing engine 138 (not shown in FIG. 2) to the analytics engine 200 in the results feedback path 256.

The exemplary machine learning algorithm 212 is used on data factors to generate the analytical model 220 that is used to find new usage patterns in the combined data sets 208. The exemplary machine learning algorithm 212 employs supervised machine learning classification/clustering techniques, whereby existing labeled CDC contracts are used to train the analytical model 220. In addition, unsupervised machine learning clustering techniques are employed to cluster unknown CDC patterns. The clustering techniques employed include data dimensionality reduction, subspace clustering, projected clustering and hybrid approaches.

Once the model 220 has been trained, for example, using a training data set obtained from a portion of the combined data sets 208, anomaly detection techniques can be employed at run-time to identify anomalies that do not conform to the model baseline.

The analytical model 220 is called with new data factors from usage data 208, which groups (clusters) usage data into one of a plurality of previously defined usage pattern clusters, or detects a new usage pattern as an anomaly and creates a new usage pattern cluster, as discussed further below in conjunction with FIG. 5.

FIG. 3 illustrates exemplary pseudo code 300 for an exemplary implementation of application 210, according to one embodiment of the disclosure. As shown in FIG. 3, the exemplary application 210 performs the following steps:

1. Obtain new usage data 117;
2. Extract data factors from the usage data 117;
3. Send data factors to the analytical model 220;
4. Receive and interpret a response from the analytical model 220;
5. If the response identifies a new cluster suggesting a new usage pattern, then an event is triggered to create a new CDC 250, corresponding tests of the new CDC 252 and associated (anonymized) test data 254, as discussed further below in conjunction with FIG. 6;
6. The CDC 250, CDC tests 252 and associated test data 254 are integrated into the software development life cycle (SDLC) process 102; and
7. If the response is an existing cluster pattern, then update detection information, such as a date, as this can be used as additional information to decide if a CDC has not been seen or used in a long time, thus removing and possibly descoping service functionality.

For additional details regarding the generation of CDCs and testing of CDCs, see, for example, the Pact family of frameworks that provide support for CDCs testing (e.g., https://docs.pact.io/) and/or the Spring Cloud Contract umbrella project holding solutions that help users in successfully implementing a CDCs approach (e.g., https://cloud.spring.io/spring-cloud-contract/), each incorporated by reference herein in their entirety.

FIG. 4 illustrates exemplary sample data 400 that may be processed by the analytics engine 200 of FIG. 2, according to an embodiment of the disclosure. The exemplary sample data 400 from the usage data 117 comprises a number of relevant features (or factors) that can be extracted by the analytics engine 200. The factors extracted from the sample data 400 for the example of FIG. 4 comprise: Service Name: "Service A"; Service Function Call: "products/latest"; and Service Function Parameters: "limit=3". The processing of these extracted factors is discussed further below in conjunction with FIG. 6.

Figure 5:
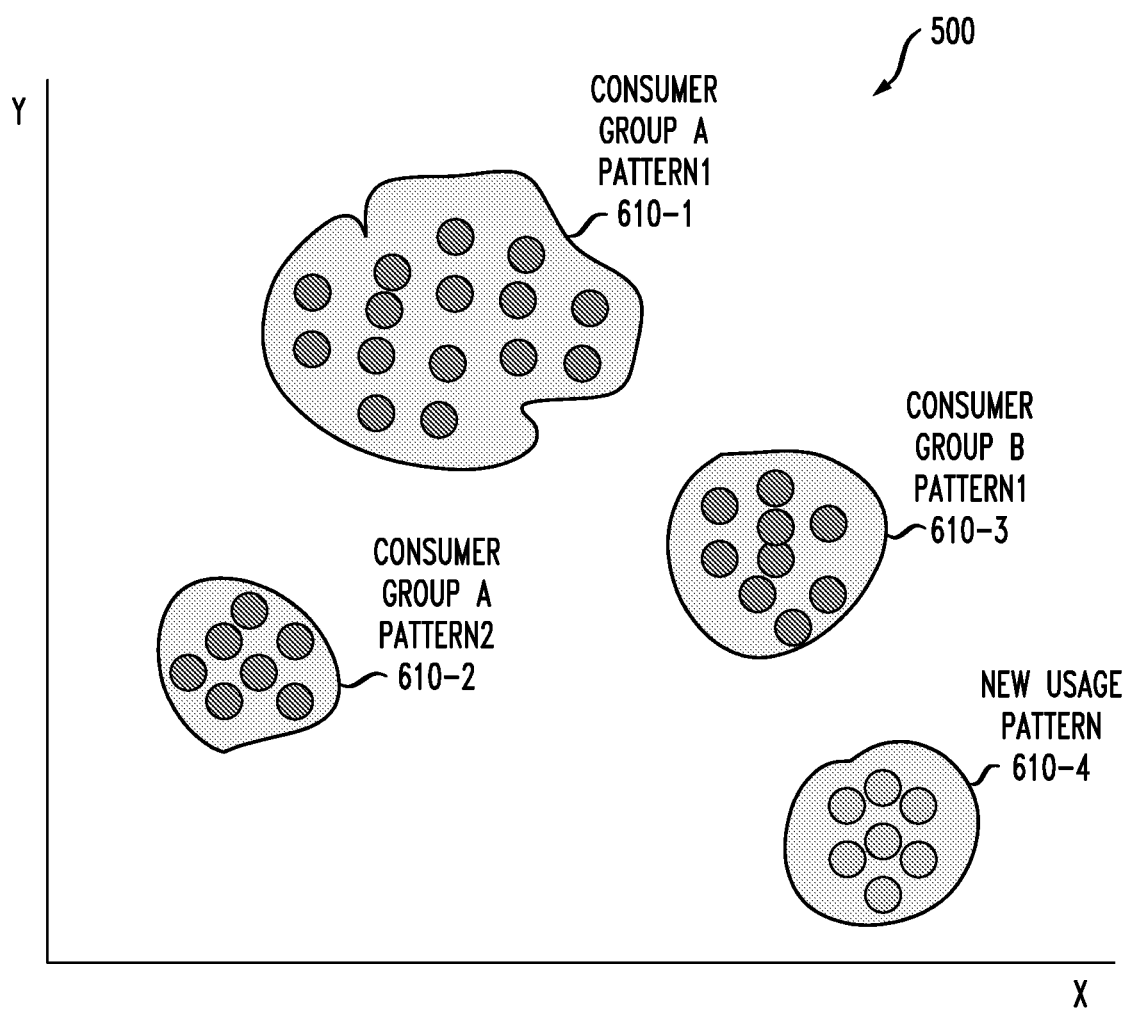
FIG. 5 illustrates an exemplary output of a clustering and anomaly detection model where a number of patterns (cluster groupings) are identified, according to one embodiment.

FIG. 5 illustrates an exemplary output 500 of the clustering and anomaly detection model 220, where four patterns (cluster groupings) 610-1 through 610-4 have been identified, three of which are existing known patterns and one is new. As shown in FIG. 5, three usage clusters 610-1 through 610-3 are identified, where usage cluster 610-1 corresponds to a first usage pattern by consumer group 124-A (FIG. 1); usage cluster 610-2 corresponds to a second usage pattern by the consumer group 124-A; and usage cluster 610-3 corresponds to a first usage pattern by consumer group 124-B (FIG. 1).

In addition, a fourth, new cluster 610-4 is identified by the clustering and anomaly detection model 220 employed by the analytics engine 200, which suggests a new (e.g., not previously seen) usage pattern by one or more consumers 124. The creation of the new cluster 610-4 will trigger information the application 210 to generate the new CDC 250, CDC tests 252 and associated (anonymous) test data 254, as discussed above, for example, in conjunction with FIG. 3.

For example, the clustering and anomaly detection model 220 may employ a k-means clustering method of vector quantization, which aims to partition n observations into k clusters in which each observation belongs to the cluster with the nearest mean, serving as a prototype of the cluster.

In one or more embodiments, if the generated test data 254 is sensitive and classified as secure, the test data 254 can be routed to a closed SDLC engine 102 that is tasked with ensuring that only machine access is allowed (e.g., in a closed system loop, with no human access) and where outputs are restricted to only statistics of actual CDC test results 256. Under these conditions, only the CDC and the automated CDC tests (minus the original test response data) is fed back to the general SDLC process. From here, anonymized test data can be generated. In this manner, the analytics engine 200 performs internal learning, whereby proprietary or confidential data stays in the closed system and is secured by the system.

FIG. 6 illustrates exemplary pseudo code 600 for processing the factors extracted from the exemplary sample data 400 of FIG. 4, according to an embodiment of the disclosure. As noted above, the exemplary factors extracted from the sample data 400 for the example of FIG. 4 comprise Service Name: "Service A"; Service Function Call: "products/latest"; and Service Function Parameters: "limit=3".

As shown in FIG. 6, for an exemplary consumer, Analytics Consumer, and exemplary service A, a new cluster 3 was identified for the Service Function Call: "products/latest" as a new usage of the service A. The application 210 will generate a new CDC 250, corresponding tests 252 for the new CDC and associated test data 254 for the new usage pattern, using the pseudo code 300 of FIG. 3, to assess the performance of the exemplary service A under the new usage pattern and conformance to the new CDC 250. It should be noted that while FIG. 6 is in the form of a PACT test file, the solution is not restricted to outputting only in this format as it will be possible to add additional output formats, as would be apparent to a person of ordinary skill in the art.

Among other benefits, the disclosed techniques for analytically generating micro-service CDCs and automated tests allow consumers 124 to be presented with their usage patterns; and service providers can see where less utilized service features can be removed. Conventional manual techniques for generating CDCs and automated tests of CDCs can be replaced with the disclosed techniques that employ machine learning to detect new usage patterns and to generate corresponding new CDCs and automated tests. In one or more embodiments, the exemplary automated CDC test generation system scales and learns incrementally.

CONCLUSION

One or more embodiments of the disclosure provide methods and apparatus for analytically generating micro-service CDCs and automated testing of the CDCs. The foregoing applications and associated embodiments should be considered as illustrative only, and numerous other embodiments can be configured using the techniques disclosed herein, in a wide variety of different applications.

It should also be understood that the disclosed techniques for generating CDCs and automated tests, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating CDCs and automated tests may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as analytics engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of an automated CDC test generation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the automated CDC test generation devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
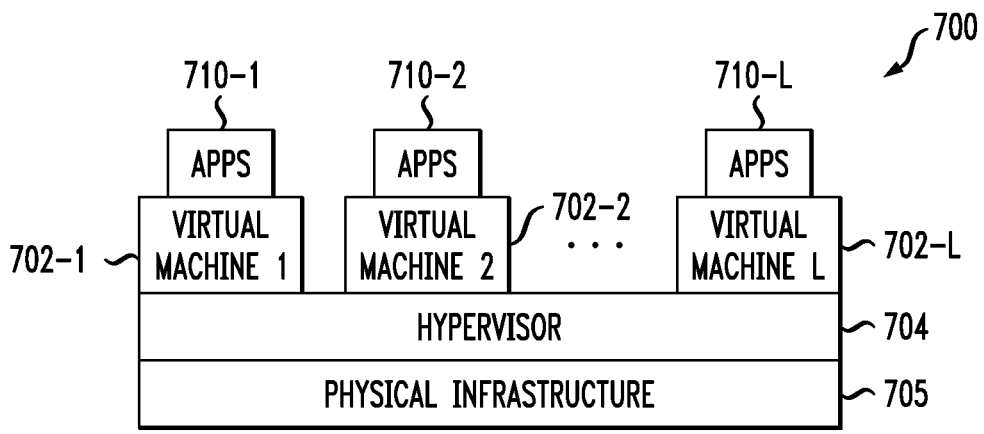
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™ or Vblock® converged infrastructure commercially available from VCE, the Virtual Computing Environment Company, now the Converged Platform and Solutions Division of Dell EMC of Hopkinton, Mass.. The underlying physical machines may comprise one or more distributed processing platforms that include storage products.

Particular types of storage products that can be used in implementing a given storage system of the automated CDC test generation engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed automated CDC test generation apparatus may each run on a computer, server, storage device or other processing platform element. A given such element may be viewed as an example of what is more generally referred to herein as a "processing device." The cloud infrastructure 700 shown in FIG. 7 may represent at least a portion of one processing platform.

Figure 8:
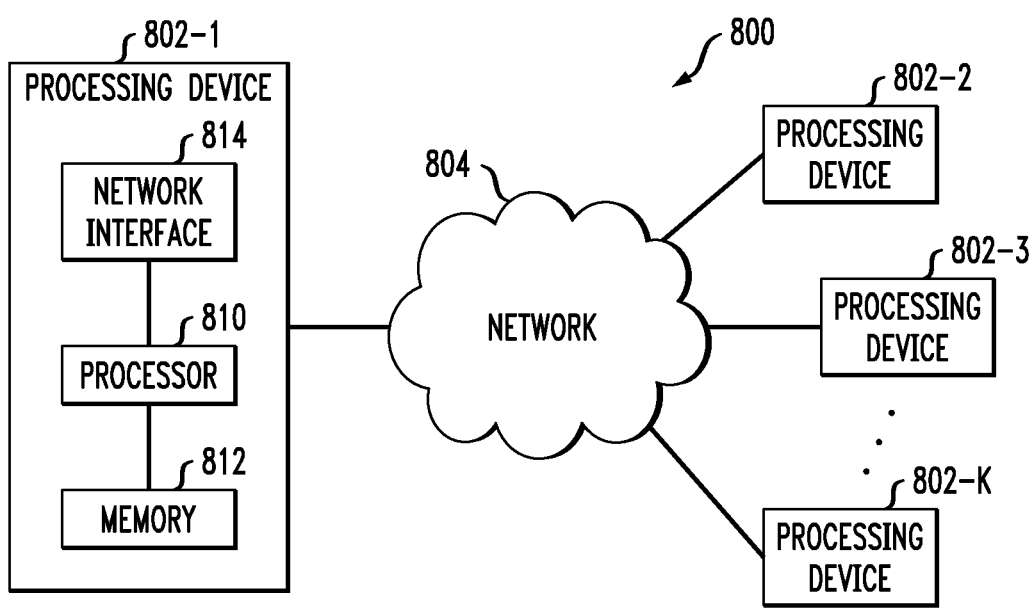
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIGS. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 3 and 6 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a plurality of usage data records for a plurality of consumers of a micro-service from a gateway of a run-time environment, wherein the plurality of usage data records comprises real-time function call information for said micro-service;
extracting one or more data features from each of the usage data records, the one or more data features comprising: a plurality of service function call names associated with said real-time function call information and one or more service function parameters of each of said plurality of service function call names;
applying, using at least one processing device, a clustering algorithm to said usage data records to assign said usage data records to one of a plurality of usage pattern clusters based on said one or more extracted data features, wherein each of said plurality of usage pattern clusters comprises usage data records, and wherein said plurality of usage pattern clusters comprises:
  at least one existing usage pattern cluster associated with one or more existing Consumer-Driven Contracts that define consumer expectations of the micro-service, with respect to an existing usage pattern associated with the existing usage pattern cluster, and
  a new usage pattern cluster not associated with said one or more existing Consumer-Driven Contracts;
performing the following steps when the clustering algorithm creates said new usage pattern cluster:
  creating a new Consumer-Driven Contract that defines consumer expectations of the micro-service, with respect to a new usage pattern associated with the new usage pattern cluster, wherein the new Consumer-Driven Contract is indicative of one or more data structure formats of responses provided from said micro-service in response to corresponding consumer requests; and
  generating one or more automated Consumer-Driven Contract tests to verify whether responses sent from said micro-service conform to the data structure format in the new Consumer-Driven Contract.

2. The method of claim 1, further comprising the step of storing one or more of said new Consumer-Driven Contract, said automated Consumer-Driven Contract tests and results of said automated Consumer-Driven Contract tests in a data store.

3. The method of claim 1, wherein said obtaining step further comprises obtaining run-time operations data from the run-time environment, wherein said steps of creating and generating are based at least in part on said run-time operations data.

4. The method of claim 1, wherein the following steps further comprise the step of generating anonymous data to validate the new usage pattern.

5. The method of claim 1, wherein the new usage pattern is validated using anonymous data in a closed system loop without human access.

6. The method of claim 1, wherein the applying step is performed at a plurality of states of a software development life cycle of the micro-service.

7. The method of claim 1, wherein the applying step further comprises the step of applying one or more of a machine learning algorithm and an anomaly detection algorithm to the usage data records to identify one or more patterns in the usage data records.

8. The method of claim 1, further comprising the step of applying a Supervised Machine Learning Classification/Clustering technique to labeled usage data records to train an analytical model.

9. A system, comprising:
a memory; and
at least one processing device, coupled to the memory, operative to implement the following steps:
  obtaining a plurality of usage data records for a plurality of consumers of a micro-service from a gateway of a run-time environment, wherein the plurality of usage data records comprises real-time function call information for said micro-service;
  extracting one or more data features from each of the usage data records, the one or more data features comprising: a plurality of service function call names associated with said real-time function call information and one or more service function parameters of each of said plurality of service function call names;
  applying, using at least one processing device, a clustering algorithm to said usage data records to assign said usage data records to one of a plurality of usage pattern clusters based on said one or more extracted data features, wherein each of said plurality of usage pattern clusters comprises usage data records, and wherein said plurality of usage pattern clusters comprises:
    at least one existing usage pattern cluster associated with one or more existing Consumer-Driven Contracts that define consumer expectations of the micro-service, with respect to an existing usage pattern associated with the existing usage pattern cluster, and
    a new usage pattern cluster not associated with said one or more existing Consumer-Driven Contracts;
  performing the following steps when the clustering algorithm creates said new usage pattern cluster:
    creating a new Consumer-Driven Contract that defines consumer expectations of the micro-service, with respect to a new usage pattern associated with the new usage pattern cluster, wherein the new Consumer-Driven Contract is indicative of one or more data structure formats of responses provided from said micro-service in response to corresponding consumer requests; and
    generating one or more automated Consumer-Driven Contract tests to verify whether responses sent from said micro-service conform to the data structure format in new Consumer-Driven Contract.

10. The system of claim 9, further comprising the step of storing one or more of said new Consumer-Driven Contract, said automated Consumer-Driven Contract tests and results of said automated Consumer-Driven Contract tests in a data store.

11. The system of claim 9, wherein said obtaining step further comprises obtaining run-time operations data from the run-time environment, wherein said steps of creating and generating is based at least in part on said run-time operations data.

12. The system of claim 9, wherein the following steps further comprise the step of generating anonymous data to validate the new usage pattern.

13. The system of claim 9, wherein the new usage pattern is validated using anonymous data in a closed system loop without human access.

14. The system of claim 9, wherein the applying step is performed at a plurality of states of a software development life cycle of the micro-service.

15. The system of claim 9, wherein the applying step further comprises the step of applying one or more of a machine learning algorithm and an anomaly detection algorithm to the usage data records to identify one or more patterns in the usage data records.

16. The system of claim 9, further comprising the step of applying a Supervised Machine Learning Classification/Clustering technique to labeled usage data records to train an analytical model.

17. A computer program product, comprising a non-transitory machine-readable storage medium having encoded therein executable code of one or more software programs, wherein the one or more software programs when executed by at least one processing device perform the following steps:
  obtaining a plurality of usage data records for a plurality of consumers of a micro-service from a gateway of a run-time environment, wherein the plurality of usage data records comprises real-time function call information for said micro-service;

extracting one or more data features from each of the usage data records, the one or more data features comprising: a plurality of service function call names associated with said real-time function call information and one or more service function parameters of each of said plurality of service function call names;

applying, using at least one processing device, a clustering algorithm to said usage data records to assign said usage data records to one of a plurality of usage pattern clusters based on said one or more extracted data features, wherein each of said plurality of usage pattern clusters comprises usage data records, and wherein said plurality of usage pattern clusters comprises:

at least one existing usage pattern cluster associated with one or more existing Consumer-Driven Contracts that define consumer expectations of the micro-service, with respect to an existing usage pattern associated with the existing usage pattern cluster, and a new usage pattern cluster not associated with said one or more existing Consumer-Driven Contracts;

performing the following steps when the clustering algorithm creates said new usage pattern cluster:

creating a new Consumer-Driven Contract that defines consumer expectations of the micro-service, with respect to a new usage pattern associated with the new usage pattern cluster, wherein the new Consumer-Driven Contract is indicative of one or more data structure formats of responses provided from said micro-service in response to corresponding consumer requests; and generating one or more automated Consumer-Driven Contract tests to verify whether responses sent from said micro-service conform to the data structure format in new Consumer-Driven Contract.

18. The computer program product of claim 17, wherein said obtaining step further comprises obtaining run-time operations data from the run-time environment, wherein said steps of creating and generating is based at least in part on said run-time operations data.

19. The computer program product of claim 17, wherein the following steps further comprise the step of generating anonymous data to validate the new usage pattern.

20. The computer program product of claim 17, wherein the new usage pattern is validated using anonymous data in a closed system loop without human access.

* * * * *

UNITED STATES PATENT AND TRADEMARK OFFICE
CERTIFICATE OF CORRECTION

| | | |
|---|---|---|
| PATENT NO. | : 10,956,918 B1 | Page 1 of 1 |
| APPLICATION NO. | : 15/800593 | |
| DATED | : March 23, 2021 | |
| INVENTOR(S) | : Sean Creedon et al. | |

It is certified that error appears in the above-identified patent and that said Letters Patent is hereby corrected as shown below:

On the Title Page

Item (57) Abstract, Line 2, replace "Consumer- Driven Contracts" with -- Consumer-Driven Contracts --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*